US007325228B1

(12) United States Patent
Morris et al.

(10) Patent No.: US 7,325,228 B1
(45) Date of Patent: Jan. 29, 2008

(54) DATA SPECULATION ACROSS A PROCEDURE CALL USING AN ADVANCED LOAD ADDRESS TABLE

(75) Inventors: Dale C. Morris, Steamboat Springs, CO (US); Jonathan Ross, Woodinville, WA (US); Achmed Rumi Zahir, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 828 days.

(21) Appl. No.: 10/426,756

(22) Filed: Apr. 30, 2003

(51) Int. Cl.
G06F 9/45 (2006.01)
G06F 7/38 (2006.01)

(52) U.S. Cl. .................... 717/136; 717/140; 717/159; 712/226

(58) Field of Classification Search ................ 712/226, 712/245; 717/136, 140, 151, 158, 159, 152, 717/154
See application file for complete search history.

(56) References Cited

U.S. PATENT DOCUMENTS

| 5,542,075 | A | 7/1996 | Ebcioglu et al. |
| 5,611,063 | A | 3/1997 | Loper et al. |
| 5,966,544 | A | 10/1999 | Sager |
| 6,332,214 | B1 | 12/2001 | Wu |
| 6,618,803 | B1 * | 9/2003 | Hannum et al. ............ 712/225 |
| 6,631,460 | B1 * | 10/2003 | Morris et al. ............... 712/217 |
| 6,681,317 | B1 * | 1/2004 | Mathews ..................... 712/203 |
| 7,062,636 | B2 * | 6/2006 | Baxter et al. ............... 712/218 |

OTHER PUBLICATIONS

Zahir et al., "OS and Compiler Considerations in the Design of the IA-64 Architecture", Nov. 2000, originally published in ASPLOS-IX (the Ninth International Conference on Architectural Support for Programming Languages and Operating Systems) held in Cambridge, MA in Nov. 2000, pp. 212-222.*
Lin et al., "Speculative register promotion using advanced load address table (ALAT)", Code Generation and Optimization, 2003. CGO 2003. International Symposium, Mar. 23-26, 2003, pp. 125-134.*
"Introducing The IA-64 Architecture", Huck et al., Oct. 2000, IEEE, pp. 12-23.*

* cited by examiner

Primary Examiner—Tuan Dam
Assistant Examiner—John J Romano

(57) ABSTRACT

A method of converting an original code sequence to a modified code sequence where the original code sequence includes a procedure call that is prior to a load instruction to one of a first plurality of registers is provided. The method includes inserting the load instruction into the modified code sequence and inserting the procedure call into the modified code sequence subsequent to the load instruction. The method further includes inserting an advanced load instruction to one of a second plurality of registers into the modified code sequence prior to the procedure call and inserting a checking instruction associated with the advanced load instruction into the modified code sequence subsequent to the procedure call.

35 Claims, 6 Drawing Sheets

DATA SPECULATION ACROSS A PROCEDURE CALL USING AN ADVANCED LOAD ADDRESS TABLE

THE FIELD OF THE INVENTION

The present invention generally relates to the execution of instructions in computer systems and, more particularly, to data speculation across procedure calls using an advanced load address table.

BACKGROUND OF THE INVENTION

Computer systems include at least one processor and at least one memory. The memory stores information such as program instructions, data, and an operating system. The program instructions can include a compiler for compiling application programs. The operating system controls the processor and the memory for system operations and for execution of the program instructions.

In the execution of program instructions, data speculation techniques have been used to allow a compiler to schedule a load instruction before one or more logically prior store instructions, i.e., a store instructions that precedes the load instruction in program order, when the compiler has information to suggest that the load and store instructions are unlikely to conflict, i.e., reference the same portion of memory. A load instruction that is scheduled before a logically prior store instruction is known as an advanced load. Because load operations may take a relatively large amount of time to perform by a processor, significant time may be saved by performing a load ahead of schedule.

A hardware structure such as an advanced load address table (ALAT) may be used to monitor advanced loads to ensure that the advanced load does not conflict, i.e., access the same portion of memory, as the store instruction. The compiler schedules a check operation subsequent to the store instruction to query the ALAT to determine whether or not a conflict exists. If a conflict does not exist, then execution continues. If a conflict does exist, then a correction mechanism is invoked to re-do the load associated with the advanced load and any other instructions that were speculatively computed based on the value loaded by the advanced load.

To monitor an advanced load operation, the ALAT stores the target register number and the memory location of the advanced load instruction to identify the advanced load operation. If a store is performed to the memory location of the advanced load instruction, then the ALAT entry that contains that memory location number is invalidated. Accordingly, when a checking instruction included as part of an advanced load operation is executed to verify whether a store conflicted with the advanced load, the checking instruction will not find a valid ALAT entry associated with the target register and will cause the correction mechanism to be invoked.

When a called procedure uses the same physical registers as a calling procedure, the register values are typically saved prior to executing the procedure and restored in response to returning from the procedure. Unfortunately, the state of the ALAT is not typically saved across procedures. As a result, a problem can occur with an advanced load that is scheduled prior to a logically prior procedure call where the called procedure uses the same physical registers as the calling procedure. The problem is that a checking instruction associated with an advanced load may fail to detect a conflict with the advanced load when the following two events occur. First, a store that is logically prior to the advanced load instruction conflicts with the advanced load instruction. The store may be in either the called procedure or the calling procedure. Second, the called procedure performs second advanced load to the same target register as the first advanced load.

In response to the first event, the ALAT entry associated with the first advanced load is invalidated, as it should be, because the store conflicts with the first advanced load. The second event, however, causes a second ALAT entry to be created. Because the second advanced load uses the same target register as the first advanced load, the second ALAT entry includes the same target register number that the first ALAT entry included prior to being invalidated. As a result, the checking instruction associated with the first advanced load may detect a valid ALAT entry, i.e., the second ALAT entry, associated with the target register, and incorrectly determine that the first advanced load was successful. This problem generally prevents an advanced load from being performed prior to a procedure call where the calling procedure and the called procedure use the same physical registers.

It would be desirable for computer systems to be able to execute an advanced load prior to a procedure call where the calling procedure and the called procedure use the same physical registers.

SUMMARY OF THE INVENTION

The present disclosure provides a method of converting an original code sequence to a modified code sequence where the original code sequence includes a procedure call that is prior to a load instruction to one of a first plurality of registers. The method includes inserting the load instruction into the modified code sequence and inserting the procedure call into the modified code sequence subsequent to the load instruction. The method further includes inserting an advanced load instruction to one of a second plurality of registers into the modified code sequence prior to the procedure call and inserting a checking instruction associated with the advanced load instruction into the modified code sequence subsequent to the procedure call.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. It is to be understood that other embodiments may be utilized and structural or logical changes may be made without departing from the scope of the present invention. The following detailed description, therefore, is not to be taken in a limiting sense, and the scope of the present invention is defined by the appended claims.

One embodiment of the present disclosure is directed to data speculation prior to a procedure call using an advanced load address table (ALAT) where the called procedure uses the same physical registers as the calling procedure. To perform an advanced load operation prior to a procedure call, a load instruction to a non-stacked register and an advanced load instruction to a stacked register are executed prior to the procedure call. A checking instruction associated with the advanced load instruction is executed in the calling procedure subsequent to the procedure call to determine whether a conflict occurred with the advanced load instruction. Because the load instruction and the advanced load instruction each load a value from the same address, the checking instruction effectively determines whether a conflict occurred with the load instruction. If a conflict did not occur, then the load instruction was successfully executed prior to the procedure call. If a conflict occurred, remedial instructions are executed to re-do the load associated with the load instruction.

These aspects of the present disclosure may be employed with any type of computer system that includes a microprocessor or microcontroller-based architecture such as a personal computer, a laptop, a server, a personal digital assistant (PDA), a mobile telephone, a printer, a multi-function device, a television, or an audio device. Selected portions of an embodiment of a computer system 100 are shown in FIG. 1.

Figure 1:
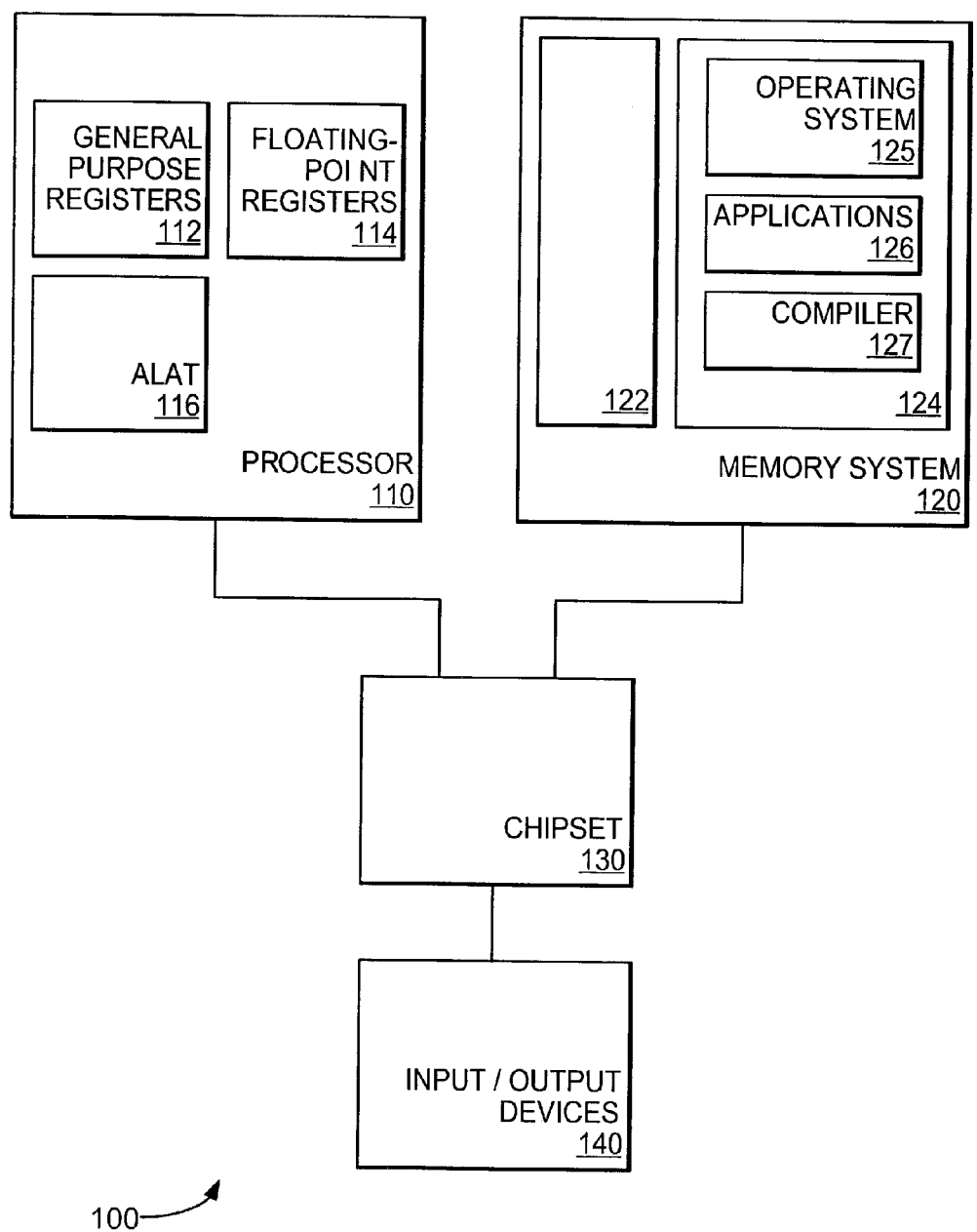
FIG. 1 is a block diagram illustrating an embodiment of selected portions of computer system.

In FIG. 1, computer system 100 includes a processor 110, a memory system 120, and input/output devices 130 Processor 110 includes general purpose registers 112, floating-point registers 114, and an advanced load address table (ALAT) 116. Memory 120 includes a first level of memory 122 that includes one or more relatively fast memory devices and a second level of memory 124 that includes one or more relatively slow memory devices. The second level of memory 124 initially stores an operating system 125, one or more applications 126, and a compiler 127. Computer system 100 is configured to execute operating system 125, applications 126, and compiler 127 using processor 110. Operating system 125, applications 126, and compiler 127 may be copied into the first level of memory 122 prior to being executed by processor 110.

In the embodiment of FIG. 1, processor 110 comprises a processor from the Itanium™ family of processors available from Intel. In other embodiments, processor 110 may be another type of processor. In addition, other embodiments may include multiple processors 110.

In the embodiment of FIG. 1, general purpose registers 112 comprise a stacked register set, and floating-point registers 114 comprises a non-stacked register set. A stacked register set includes a register stack mechanism (not shown) configured to rename registers. A stacked register is addressable by a program using its virtual address as assigned by the register stack mechanism. Accordingly, multiple registers in a stacked register set may have the same virtual address at different points in program execution. For example, although two different procedures may use the register address "r32", the register stack mechanism may assign different physical registers for each use of the register address "r32". A non-stacked register set comprises registers that are directly addressable using their physical addresses. Thus, different procedures use the same register address, such as "f2", to access the same physical register in the non-stacked register set. In other embodiments, general purpose registers 112 and floating-point registers 114 may be stacked or non-stacked register sets.

Figure 2:
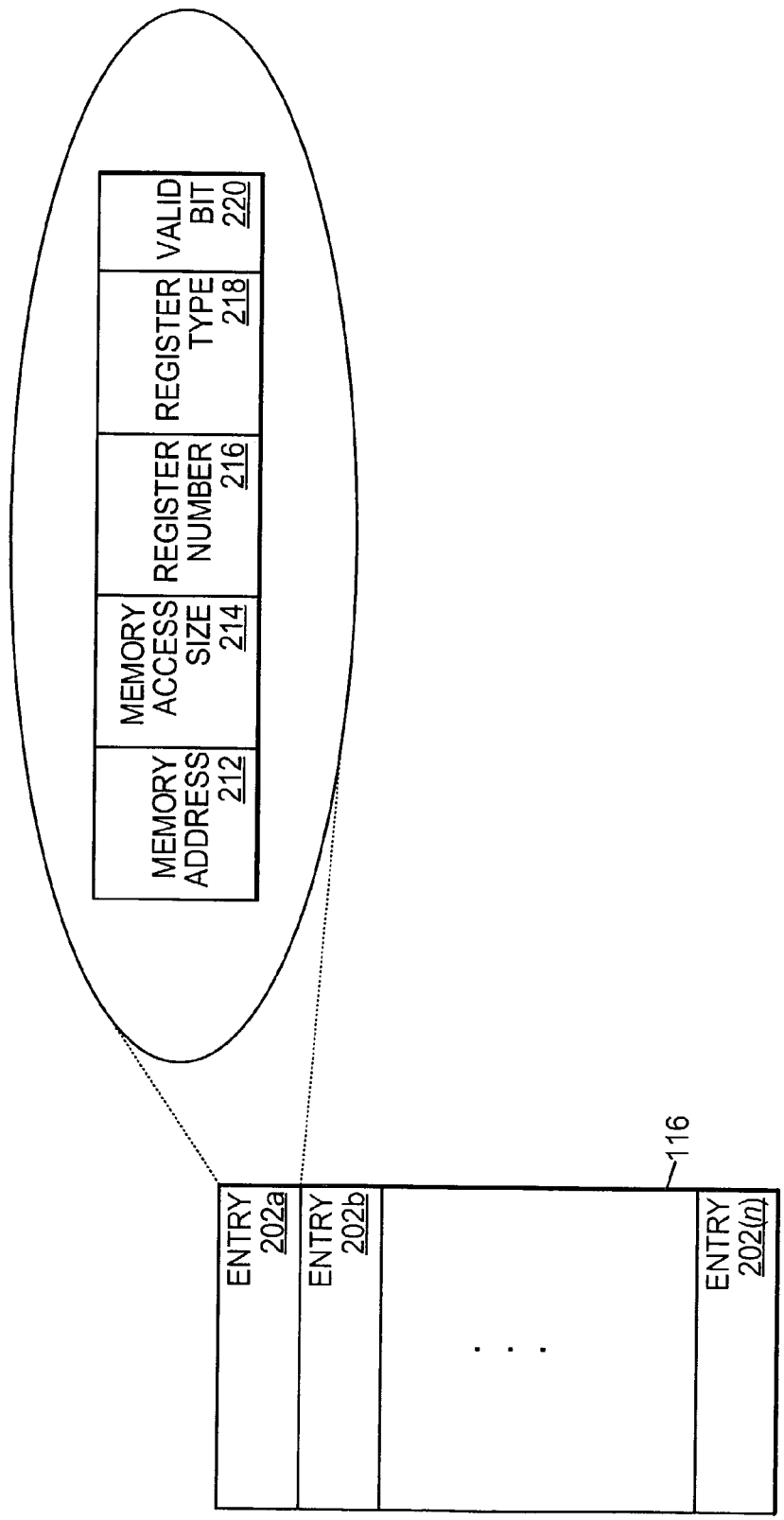
FIG. 2 is a block diagram illustrating an embodiment of an advanced load address table.

FIG. 2 illustrates an embodiment of ALAT 116. In the embodiment of FIG. 2, ALAT 116 includes a plurality of entries 202a through 202(n) where n is an integer greater than zero. Each entry 202 includes a memory address field 212, a memory access size field 214, a register number field 216, a register type field 218, and a valid bit 220.

Processor 110 causes an ALAT entry 202 to be created in response to executing an advanced load instruction. The entry 202 stores the memory address of the advanced load in memory address field 212, the size of the memory access in memory access size field 214, the register number of the target register, i.e. the register being loaded with a value, in the register number field 216, and the type of register of the target register in register type field 218. The valid bit 220 of an entry 202 is set in response to the entry being created.

Figure 3A:
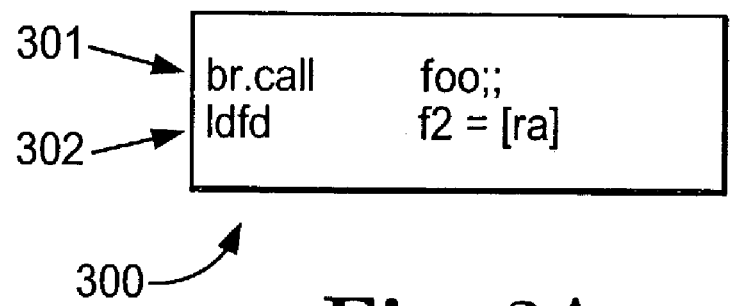
FIG. 3a is a diagram illustrating an example of an original code portion.
Figure 3B:
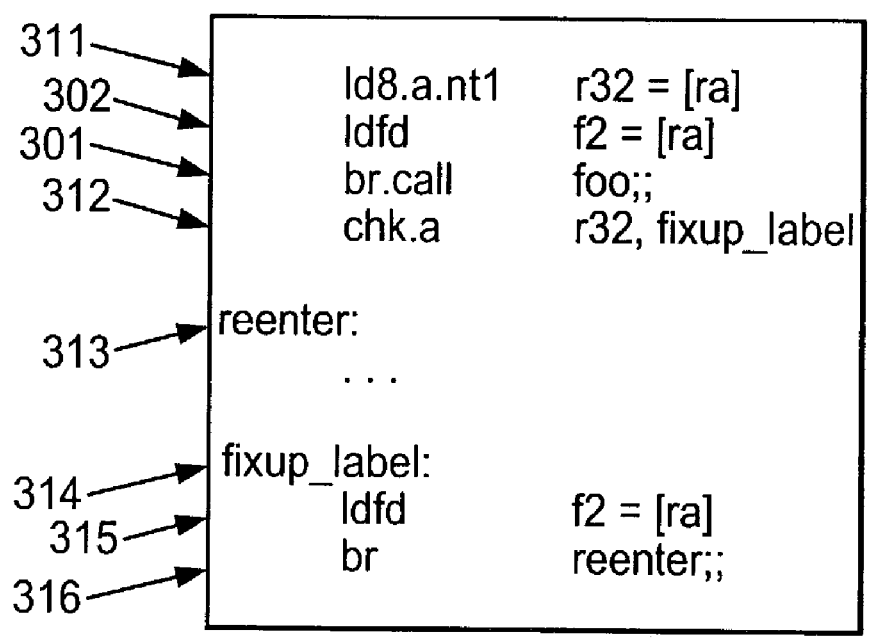
FIG. 3b is a diagram illustrating an example of a modified code portion.

The embodiment of FIG. 1 is configured to perform data speculation prior to a procedure call using ALAT 116 where the called procedure and the calling procedure each use floating-point registers 114. FIG. 3a is a diagram illustrating an example of an original code portion 300, and FIG. 3b is a diagram illustrating an example of a modified code portion 310 that includes instructions configured to perform data speculation across a procedure call where the calling procedure and the called procedure use the same physical registers, i.e. registers from floating-point registers 114.

As shown in the original code portion 300, a load instruction 302 is configured to cause a floating-point register "f2" to be loaded with a value from an address subsequent to a procedure call 301 that is configured to cause to a procedure called "foo" to be executed.

In the modified code portion 310, load instruction 302 is moved prior to procedure call 301. Also, an advanced load instruction 311 to a register "r32" in general purpose registers 112 is added prior to procedure call 301 and a checking instruction 312 is added subsequent to procedure call 301. In addition, remedial instructions 315 and 316 and labels 313 and 314 are included in case a conflict occurs with advanced load instruction 311.

In execution, advanced load instruction 311 causes a value to be loaded from an address "[ra]" to one of the general purpose registers 112, i.e., "r32". In addition, advanced load instruction 311 causes an entry 202 associated with the general purpose register 112 to be created in ALAT 116. Load instruction 302 causes a value to be loaded from the same address as advanced load instruction 311, i.e., "[ra]", to one of the floating-point registers 114, i.e., "f2".

Subsequent to the execution of load instruction 302, procedure call 301 causes a procedure "foo" to be called. After the procedure "foo" is executed, checking instruction 312 causes the validity of entry 202 to be examined to determine whether a store conflicted with advanced load instruction 311.

Any instruction in the procedure "foo" or in any procedure called within procedure "foo" that conflicts with advanced load instruction 311 will cause the entry 202 to be invalidated to indicate that a conflict occurred. For example, a store within procedure "foo" may conflict with advanced load instruction 311 by storing a value to the address associated with instruction 311. The entry 202 includes the address of the value that is loaded into a target register in response to advanced load instruction 311.

In addition, an instruction outside of the procedure "foo" that conflicts with advanced load instruction 311 causes the entry 202 to be invalidated to indicate that a conflict occurred if that instruction is executed between the execution of advanced load instruction 311 and the execution of checking instruction 312. In embodiments that include multiple processors 110, an instruction that conflicts with advanced load instruction 311 may be executed by any of the processors 110.

If a conflict occurred with advanced load instruction 311, then a conflict necessarily occurred with load instruction 302 because instruction 302 and instruction 311 load from the same address, i.e., "[ra]". Accordingly, by checking the validity of the entry 202 associated with advanced load instruction 311, processor 110 determines whether a conflict occurred with load instruction 302.

If a conflict occurred with load instruction 302, processor 110 executes remedial instructions 315 and 316 to re-do load instruction 302. In particular, checking instruction 312 causes a program segment at label 314, i.e., "fixup_label", to be branched to in response to a conflict being detected. The program segment that begins at label 314 includes a load instruction 315 that effectively re-does the load associated with load instruction 302 by loading the value from the address into register "f2". A branch instruction 316 then causes the program to return to the point indicated by label 313, i.e., "reenter". Accordingly, remedial instructions 315 and 316 cause the correct value to be loaded into register "f2" then cause the program to resume.

If a conflict did not occur, then load instruction 302 was successfully executed prior to procedure call 301 and no further action is needed.

Because general purpose registers 112 are operated as a stacked register set, the physical register used by advanced load instruction 311 as "r32" will only be used by the procedure "foo" or any procedures called within the procedure "foo" in response to a register stack overflow of general purpose registers 112. In response to a register stack overflow, all entries in ALAT 116, including the ALAT entry 202 associated with advanced load instruction 311, will either be invalidated or specifically identified using a technique such as the technique described in U.S. Pat. No. 6,631,460, entitled "Advanced Load Address Table Entry Invalidation based on register address wraparound", filed on Apr. 27, 2000, and listing Dale Morris et al. as inventors, prior to returning from the procedure "foo". As a result, if an advanced load performed by the procedure "foo" or any procedures called within the procedure "foo" causes an additional entry associated with the physical register used by advanced load instruction 311 to be created in ALAT 116, this additional ALAT entry will either be invalidated or identified separately from the ALAT entry 202 of advanced load instruction 311 prior to returning from the procedure "foo". Because of this, checking instruction 312 will not determine that a conflict did not occur with advanced load instruction 311 when, in fact, a conflict did occur.

If a conflict occurs with advanced load instruction 311, then the ALAT entry 202 of advanced load instruction 311 will be invalidated. Even if an advanced load in "foo" causes another entry associated with the same physical register as advanced load instruction 311 to be created in ALAT 116, this additional ALAT entry will either be invalidated or identified separately from the ALAT entry 202 of advanced load instruction 311 prior to executing checking instruction 312. Thus, when checking instruction 312 causes ALAT 116 to be accessed to determine whether a conflict occurred, it will not detect a valid ALAT entry 202 associated with advanced load instruction 311 if a conflict occurred.

To ensure that all conflicts with load instruction 302 are detected, the size of the value loaded by advanced load instruction 311 should be greater than or equal to the size of the value loaded by load instruction 302. For example, if load instruction 302 loads an eight byte value, then advanced load instruction 311 should load at least an eight byte value.

If advanced load instruction 311 cannot load as large of a value as load instruction 302, then additional advanced load instructions (not shown) and corresponding checking instructions may be used such that each advanced load instruction loads a portion of the value. For example, if load instruction 302 loads a value that includes 10 bytes, a first advanced load instruction may be used to create an ALAT entry 202a associated with a first one of general purpose registers 112 for the first 8 bytes (i.e. the entry 202a would include the address of the first byte in memory address field 212 and a size of 8 in the memory access size field 214) and a second advanced load instruction may be used to create an ALAT entry 202b associated with a second one of general purpose registers 112 for the last 2 bytes (i.e. the entry 202b would include the address of the ninth byte in memory address field 212 and a size of 2 in the memory access size field 214). In this example, a conflict with load instruction 302 would be detected if either a checking instruction associated with the first advanced load instruction detected that its associated entry 202a was invalid or the checking instruction associated with the second advanced load instruction detected that its associated entry 202b was invalid.

In the above description, procedure call 301 comprises an unconditional branch instruction. Procedure call 301 may also be any other type of conditional or unconditional instruction configured to cause a procedure to be called.

An instruction that is executed speculatively by processor 110 may be referred to as a speculatively executed instruction. In the embodiments described herein, the procedure call, the load instruction, and the advanced load instruction may each be speculatively executed instructions.

As shown in the example in FIG. 3b, advanced load instruction 311 may include a cache hint, e.g. ".nt1", to indicate a cache level for the value to be stored.

Figure 4:
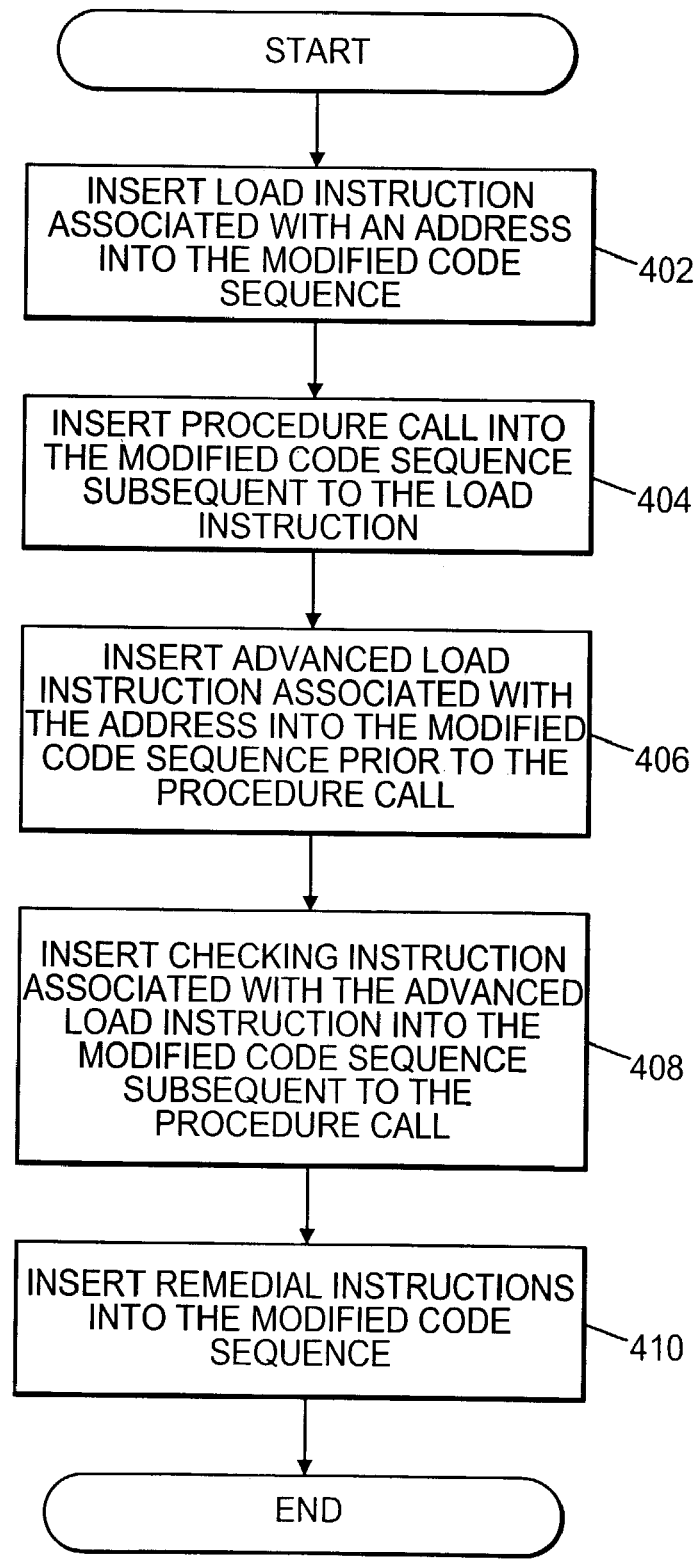
FIG. 4 is a flow chart illustrating an embodiment of a method for scheduling an advanced load operation prior to a procedure call.
Figure 5:
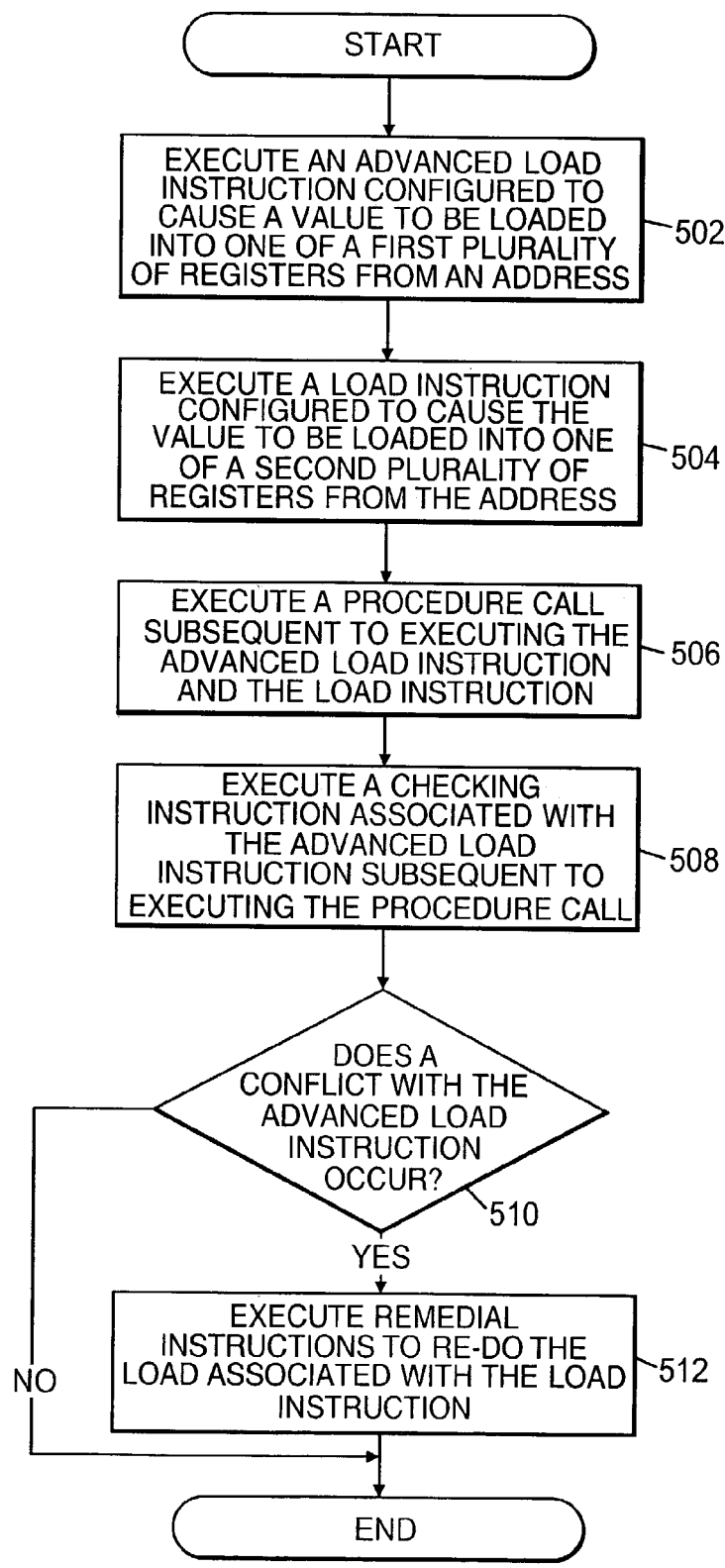
FIG. 5 is a flow chart illustrating an embodiment of a method for performing an advanced load operation prior to a procedure call.
Figure 6:
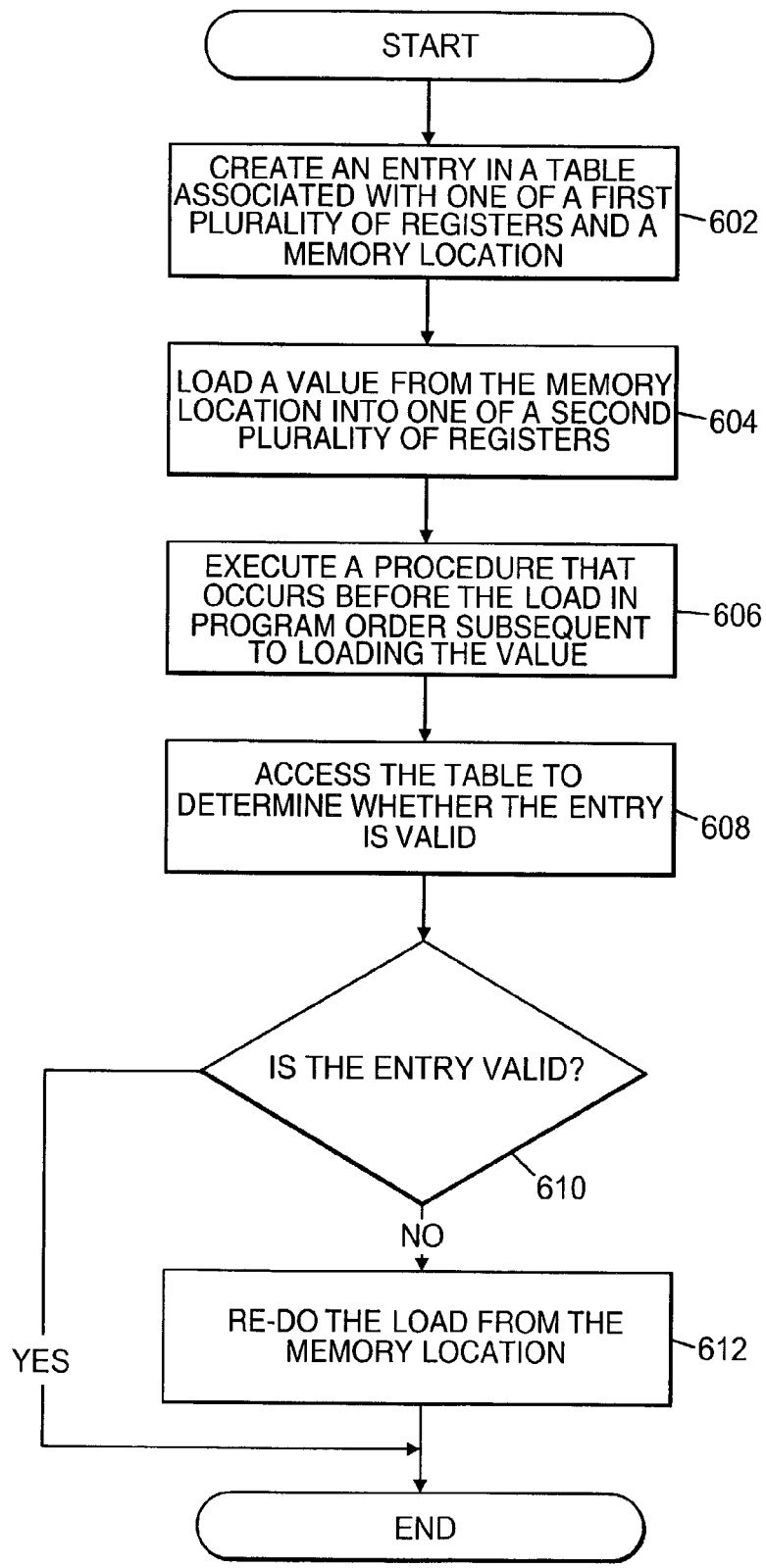
FIG. 6 is a flow chart illustrating an embodiment of a method for executing instructions to cause an advanced load operation to be performed prior to a procedure call.

Embodiments of methods to perform the type of data speculation just described are shown in FIGS. 4-6 and will be described with reference to modified code portion 310.

FIG. 4 is a flow chart illustrating an embodiment of a method for scheduling an advanced load operation prior to a procedure call where the calling procedure and the called procedure may each use a non-stacked register set such as floating-point registers 114. As noted above, floating-point registers 114 are addressable by a procedure using their physical addresses, e.g. "f2". In FIG. 4, load instruction 302 is inserted into the modified code sequence as indicated in a block 402. Load instruction 302 is configured to load a value from an address into a target register, "f2", in floating-point registers 114. Procedure call 301 is inserted into the modified code sequence subsequent to the load instruction as indicated in a block 404. Because load instruction 302 will be executed prior to procedure call 301 rather than subsequent to procedure call 301 as in original code sequence 300, the load becomes part of an advanced load operation.

Advanced load instruction 311 is inserted into the modified code sequence prior to the procedure call as indicated in a block 406. Advanced load instruction 311 is configured to cause a value to be loaded from the same address as load instruction 302 into a register in general purpose registers 112. Because this load is an advanced load, processor 110 will cause an entry 202 associated with instruction 311 to be created in ALAT 116. The entry 202 includes the address associated with advanced load instruction 311. Advanced load instruction 311 is inserted prior to the procedure call but may be inserted either prior to load instruction 302 (as shown in the example of FIG. 3b) or subsequent to load instruction 302 (not shown).

Checking instruction 312, which is associated with advanced load instruction 311, is inserted into the modified code sequence as indicated by a block 408. Checking instruction 312 is inserted subsequent to the procedure call and is used to determine whether a conflict occurred with advanced load instruction 311. Remedial instructions 315 and 316 and labels 313 and 314 are inserted into the modified code sequence as indicated in a block 410.

The embodiment of the method described in FIG. 4 is employed by compiler 127. Accordingly, compiler 127 may cause data speculation to occur prior to a procedure call by scheduling instructions for execution in a program using the method just described. Compiler 127 is one example of a program that is storable on a computer-readable medium, such as memory system 120, and is executable by computer system 100. In other embodiments, compiler 127 may be stored on and executed from other computer-readable media including portable media such as a disk or CD-ROM to create programs that include the data speculation technique illustrated in FIG. 4.

FIG. 5 is a flow chart illustrating an embodiment of a method for executing instructions to cause an advanced load operation to be performed prior to a procedure call where the calling procedure and the called procedure may each use a non-stacked register set such as floating-point registers 114. In particular, processor 110 executes the instructions in modified code sequence 310 such that load instruction 302 is executed prior to procedure call 301.

In FIG. 5, advanced load instruction 311, which is configured to cause a value to be loaded from an address into one of a first plurality of registers, i.e., a register from general purpose registers 112, is executed as indicated in a block 502. In response to executing advanced load instruction 311, processor 110 causes an entry 202 associated with advanced load instruction 311 to be created in ALAT 116. The entry 202 includes the address.

Load instruction 302, which is configured to cause the value to be loaded from the address into one of a second plurality of registers, i.e., a register from floating-point registers 114, is executed as indicated in a block 504. Procedure call 301 is executed subsequent to executing advanced load instruction 311 and load instruction 302 as indicated by a block 506. Accordingly, the load caused by load instruction 302 occurs prior to the procedure, "foo", being called for execution by procedure call 301.

Checking instruction 312, which is associated with advanced load instruction 311, is executed subsequent to executing procedure call 301 as indicated by a block 508. Processor 110 executes checking instruction 312 to determine whether a conflict occurred with advanced load instruction 311.

A determination is made as to whether a conflict with advanced load instruction 311 occurred as indicated in a block 510. By executing checking instruction 312, processor 110 determines whether the entry 202 in ALAT 116 that is associated with advanced load instruction 311 is valid. If the entry 202 is valid, then no conflict occurred, and if the entry 202 is invalid, then a conflict occurred. If a conflict occurred, then remedial instructions 315 and 316 are executed to re-do the load associated with load instruction 302 as indicated in a block 512. If no conflict occurred, then no further action is necessary.

FIG. 6 is a flow chart illustrating an embodiment of a method for performing an advanced load operation prior to a procedure call where the calling procedure and the called procedure may each use a non-stacked register set such as floating-point registers 114. An entry, such as an entry 202, associated with one of a first plurality of registers, e.g., a one of general purpose registers 112, and a memory location is created in a table, such as ALAT 116, as indicated by a block 602. As described above, one way to cause this entry to be created is by executing an advanced load instruction to one of general purpose registers 112. A value is loaded from the memory location into one of a second plurality of registers, e.g. one of floating-point registers 114, as indicated in a block 604.

A procedure that occurs before the load, in program order, is executed as indicated in a block 606. Any instruction in the procedure or in a procedure called within the procedure that conflicts with the load causes the entry created by the function in block 602 to be invalidated. The table is accessed to determine whether the entry is valid as indicated in a block 608. A determination is made as to whether the entry is valid as indicated in a block 610. If the entry is valid, then no conflict occurred and there is no need to re-do the load from block 604. If the entry is not valid, then a conflict occurred and the load from block 604 is re-done as indicated in a block 612.

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiments shown and described without departing from the scope of the present invention. Those with skill in the chemical, mechanical, electromechanical, electrical, and computer arts will readily appreciate that the present invention may be implemented in a very wide variety of embodiments. This application is intended to cover any adaptations or variations of the preferred embodiments discussed herein. Therefore, it is manifestly intended that this invention be limited only by the claims and the equivalents thereof.

What is claimed is:

1. A method of converting an original code sequence to a modified code sequence, the original code sequence including a procedure call that is configured to call a procedure and is prior to a load instruction, the method comprising:

inserting the load instruction into the modified code sequence, the load instruction configured to load a value from a memory location to one of a first plurality of registers;

inserting the procedure call into the modified code sequence subsequent to the load instruction;

inserting an advanced load instruction into the modified code sequence prior to the procedure call, the advanced load instruction configured to load the value from the memory location to one of a second plurality of registers; and inserting a checking instruction associated with the advanced load instruction into the modified code sequence subsequent to the procedure call;

wherein the first plurality of registers is usable by the procedure, and wherein the second plurality of registers is not usable by the procedure.

2. The method of claim 1 wherein the load instruction is configured to cause a floating-point register to be loaded with the value.

3. The method of claim 1 wherein the advanced load instruction is configured to cause a general purpose register to be loaded with the value.

4. The method of claim 1 wherein each of the first plurality of registers comprises a floating-point register.

5. The method of claim 1 wherein the first plurality of registers comprises a non-stacked register set.

6. The method of claim 1 wherein each of the second plurality of registers comprises a general purpose register.

7. The method of claim 1 wherein the second plurality of registers comprises a stacked register set.

8. The method of claim 1 wherein the checking instruction is configured to access an entry created in response to the advanced load instruction.

9. A computer-readable medium storing a program executable by a computer system and configured to cause the computer system to:

schedule a first instruction for execution, the first instruction configured to cause an entry associated with one of a first plurality of registers and associated with a memory location to be created in a table;

schedule a second instruction for execution, the second instruction configured to cause a first value to be loaded from the memory location into one of a second plurality of registers;

schedule a third instruction for execution subsequent to the first and second instructions, the third instruction configured to cause a procedure to be called; and schedule a fourth instruction for execution subsequent to the third instruction, the fourth instruction configured to cause the entry to be accessed to determine whether a fifth instruction stored a second value to the memory location;

wherein the first plurality of registers is not usable by the procedures and wherein the second plurality of registers is usable by the procedure.

10. The computer-readable medium of claim 9 wherein each of the first plurality of registers comprises a general purpose register.

11. The computer-readable medium of claim 9 wherein the first plurality of registers comprises a stacked register set.

12. The computer-readable medium of claim 9 wherein each of the second plurality of registers comprises a floating-point register.

13. The computer-readable medium of claim 9 wherein the second plurality of registers comprises a non-stacked register set.

14. The computer-readable medium of claim 9 wherein the first instruction comprises a speculatively executed instruction.

15. The computer-readable medium of claim 9 wherein the second instruction comprises a speculatively executed instruction.

16. The computer-readable medium of claim 9 wherein the third instruction comprises a speculatively executed instruction.

17. The computer-readable medium of claim 9 wherein the procedure includes the fifth instruction.

18. A computer system comprising:

a first processor that includes first and second pluralities of registers and an advanced load address table (ALAT); and a memory that includes a program executable by the processor;

the program configured to cause the first processor to perform an advanced load operation to one of the second plurality of registers prior to a procedure by:

creating a first entry in the ALAT associated with a first one of the first plurality of registers and a first memory location;

loading a first value from the first memory location into one of the second plurality of registers; and accessing the ALAT to determine whether the first entry is valid subsequent to executing the procedure;

wherein the first plurality of registers is not usable by the procedure, and wherein the second plurality of registers is usable by the procedure.

19. The computer system of claim 18 wherein the program includes:

a first instruction configured to cause the first entry to be created;

a second instruction configured to cause the first value to be loaded into the one of the second plurality of registers;

a third instruction subsequent to the first and second instructions in the program and configured to cause the procedure to be called; and a fourth instruction subsequent to the third instruction in the program and configured to cause the first entry to be accessed to determine whether the first entry is valid.

20. The computer system of claim 19 wherein the first instruction comprises an advanced load instruction to the first one of the first plurality of registers.

21. The computer system of claim 19 wherein each of the first plurality of registers comprises a general purpose register.

22. The computer system of claim 19 wherein the first plurality of registers comprises a stacked register set.

23. The computer system of claim 19 wherein the second instruction comprises a floating-point load instruction.

24. The computer system of claim 19 wherein each of the second plurality of registers comprises a floating-point register.

25. The computer system of claim 19 wherein the second plurality of registers comprises a non-stacked register set.

26. The computer system of claim 19 wherein the fourth instruction comprises a checking instruction.

27. The computer system of claim 26 wherein the checking instruction accesses the first entry to determine whether a fifth instruction caused the entry to be invalidated by storing a second value to the memory location.

28. The computer system of claim 27 further comprising:

a second processor;

wherein the second processor executes the fifth instruction to cause the entry to be invalidated.

29. The computer system of claim 18 wherein the program configured to cause the first processor to perform the advanced load operation to the one of the second plurality of registers prior to a procedure by:

creating a second entry in the ALAT associated with a second one of the first plurality of registers and a second memory location; and accessing the ALAT to determine whether the second entry is valid subsequent to executing the procedure.

30. The computer system of claim 29 wherein the program includes:
   a first instruction configured to cause the first entry to be created;
   a second instruction configured to cause the second entry to be created;
   a third instruction configured to cause the first value to be loaded into the one of the second plurality of registers;
   a fourth instruction subsequent to the first, second, and third instructions in the program and configured to cause the procedure to be called;
   a fifth instruction subsequent to the fourth instruction in the program and configured to cause the first entry to be accessed to determine whether the first entry is valid; and
   a sixth instruction subsequent to the fourth instruction in the program and configured to cause the second entry to be accessed to determine whether the second entry is valid.

31. A method of performing an advanced load operation prior to a procedure by a computer system comprising:
   executing an advanced load instruction configured to cause a first value to be loaded from a memory location into one of a first plurality of registers;
   executing a load instruction configured to cause the first value to be loaded from the memory location into one of a second plurality of registers;
   executing a procedure subsequent to executing the advanced load instruction and the load instruction, wherein the first plurality of registers is not usable by the procedure and the second plurality of registers is usable by the procedure; and
   executing a checking instruction associated with the advanced load instruction subsequent to executing the procedure.

32. The method of claim 31 wherein each of the first plurality of registers comprises a general purpose register.

33. The method of claim 31 wherein the first plurality of registers comprises a stacked register set.

34. The method of claim 31 wherein each of the second plurality of registers comprises a floating-point register.

35. The method of claim 31 wherein the second plurality of registers comprises a non-stacked register set.

* * * * *

UNITED STATES PATENT AND TRADEMARK OFFICE
CERTIFICATE OF CORRECTION

PATENT NO. : 7,325,228 B1
APPLICATION NO. : 10/426756
DATED : January 29, 2008
INVENTOR(S) : Dale C. Morris et al.

It is certified that error appears in the above-identified patent and that said Letters Patent is hereby corrected as shown below:

In column 9, line 45, in Claim 9, delete "procedures" and insert -- procedure, --, therefor.

Signed and Sealed this

Seventeenth Day of June, 2008

JON W. DUDAS
*Director of the United States Patent and Trademark Office*